(12) United States Patent  
Weidow, III

(10) Patent No.: US 7,048,318 B2
(45) Date of Patent: May 23, 2006

(54) MOBILE EDUCATION CENTER

(76) Inventor: William F. Weidow, III, 1102 Claudia Ct., Jacksonville, NC (US) 28540

( * ) Notice: Subject to any disclaimer, the term of this patent is extended or adjusted under 35 U.S.C. 154(b) by 30 days.

(21) Appl. No.: 10/770,752

(22) Filed: Feb. 3, 2004

(65) Prior Publication Data
US 2005/0041212 A1 Feb. 24, 2005

Related U.S. Application Data

(60) Provisional application No. 60/496,480, filed on Aug. 18, 2003.

(51) Int. Cl.
*B60R 13/00* (2006.01)
(52) U.S. Cl. .............. 296/21; 40/591; 40/590
(58) Field of Classification Search ........... 296/21; 40/482, 591; 345/179, 173, 175, 178, 177; 715/863, 753; 342/451; 178/18.03, 18.04, 178/18.01, 19.02, 19.01; 346/139 R; 348/14.08, 348/383; 434/323, 350
See application file for complete search history.

(56) References Cited

U.S. PATENT DOCUMENTS

| | | | |
|---|---|---|---|
| 649,622 A * | 5/1900 | Uting | 40/482 |
| 676,822 A * | 6/1901 | Neumayer | 40/590 |
| 1,230,369 A * | 6/1917 | Bayers | 353/82 |
| 3,475,045 A | 10/1969 | Cordes | |
| 3,883,846 A * | 5/1975 | Bruner | 40/550 |
| 3,935,654 A * | 2/1976 | Rubin | 40/563 |
| D243,235 S * | 2/1977 | Buxbom | D12/96 |
| 4,019,773 A * | 4/1977 | Vehling | 296/21 |
| 4,110,792 A * | 8/1978 | Long et al. | 348/383 |
| 4,438,580 A * | 3/1984 | Yamaji et al. | 40/590 |
| 4,446,643 A * | 5/1984 | Fujita et al. | 40/591 |
| 4,495,719 A * | 1/1985 | Futatsuishi et al. | 40/591 |
| 4,622,458 A * | 11/1986 | Boeck et al. | 342/451 |
| 4,701,627 A * | 10/1987 | Gambuti et al. | 296/21 |
| D311,362 S * | 10/1990 | Kuwata | D12/96 |
| 5,005,893 A * | 4/1991 | McCrary | 296/21 |
| 5,025,314 A * | 6/1991 | Tang et al. | 348/14.08 |
| 5,238,281 A * | 8/1993 | Chen | 296/21 |
| 5,249,833 A * | 10/1993 | Kobayashi | 296/21 |
| 5,263,756 A * | 11/1993 | Gaspar | 296/21 |
| 5,507,109 A * | 4/1996 | Rinzler | 296/21 |
| 5,515,079 A * | 5/1996 | Hauck | 345/157 |
| 5,918,924 A * | 7/1999 | Cowan | 296/21 |
| 6,036,250 A * | 3/2000 | Glatter | 296/21 |

(Continued)

*Primary Examiner*—Kiran B. Patel
(74) *Attorney, Agent, or Firm*—MacCord Mason PLLC

(57) ABSTRACT

A portable mobile education center that includes a system of electronic teaching aids that can be transported by a utility vehicle such as a HumVee is disclosed. In particular, the disclosed mobile education center is comprised of at least one electronic whiteboard networked with other electronic devices, such as personal computers and video players to provide enhanced multimedia capabilities for field training sessions. The electronic whiteboard has a display side that is attachable to a presentation side of the vehicle.

4 Claims, 2 Drawing Sheets

U.S. PATENT DOCUMENTS

| | | | |
|---|---|---|---|
| 6,119,384 A * | 9/2000 | Fischer | 40/606.02 |
| 6,122,850 A * | 9/2000 | Strzeletz | 40/591 |
| D466,837 S * | 12/2002 | Buring et al. | D12/93 |
| 6,549,230 B1 * | 4/2003 | Tosaya | 348/14.08 |
| 6,585,305 B1 * | 7/2003 | Nazginov et al. | 296/21 |
| 6,598,327 B1 * | 7/2003 | Strzeletz | 40/591 |
| 6,643,963 B1 * | 11/2003 | Beller | 40/590 |
| 6,769,726 B1 * | 8/2004 | Clark | 296/21 |
| 6,874,263 B1 * | 4/2005 | Ohmuku | 40/590 |
| 6,898,517 B1 * | 5/2005 | Froeberg | 701/207 |
| 6,904,182 B1 * | 6/2005 | Simard et al. | 382/284 |
| 6,918,200 B1 * | 7/2005 | Pena | 40/591 |
| 2003/0054329 A1 * | 3/2003 | Springett | 434/373 |
| 2005/0041212 A1 * | 2/2005 | Weidow, III | 353/13 |

* cited by examiner

MOBILE EDUCATION CENTER

This application claims the benefit of U.S. Provisional application Ser. No. 60/496,480 filed Aug. 18, 2003.

BACKGROUND OF THE INVENTION

1. Field of the Invention

The present invention relates to a system for training individuals in an outdoor setting. In particular, the present invention relates to a mobile education system consisting of a system of electronic teaching aids.

2. Description of the Prior Art

Presently, the military uses automated electronic classrooms in garrisons to train military personnel the skills needed for various field activities. However, garrison based training has shortcomings resulting from training delays that disrupt the practical application and rehearsal of learning. It is sometimes days or weeks after classroom instruction before students can reinforce learning with practical application, in many cases requiring reteaching.

At present, there is no satisfactory alternative to garrison training. One reason is that up to now, an electronic classroom has not been available for field use. Right now, field instruction lacks any type of audio/visual support. Instead, current field instruction relies heavily on turn charts and the like to present instructional material. Thus, a problem remains in that with large classes, students very seldom, if ever, actually clearly see the turn-charts or clearly understand the instructor due to environmental factors such as poor lighting and ambient noise levels. What is needed is a mobile education center for field use that includes practically all the advantages of an automated electronic garrison training facility.

SUMMARY OF THE INVENTION

The present invention addresses the above stated need by providing a mobile education center having practically all the advantages of an automated electronic garrison based classroom, while also providing timely field instruction, thus reducing the need for reteaching. The present invention relates especially to a portable mobile education center that includes a system of electronic teaching aids that can be transported by a single military utility vehicle such as a HumVee. In particular, the present invention is a mobile education center comprised of at least one electronic whiteboard networked with other electronic devices, such as personal computers and video players to provide enhanced multimedia capabilities for field training sessions. For the purposes of this disclosure, a field environment is one in which normal indoor classroom infrastructure is unavailable. An example of a field environment is an outdoor firing range.

A typical electronic whiteboard is a flat-panel overlaid with a translucent pressure-sensitive or touch-sensitive surface interfaced with a personal computer or other digital processor. The flat-panel has a display side that can be a hard smooth light reflective surface that can be written on using dry erase markers. The transport vehicle has an exterior with a presentation side adapted to secure the display side of at least one electronic whiteboard in an upright position so that it faces a trainee audience. An optional light-diffusing screen can be placed over the flat-panel surface to reduce sun glare.

Marker movements are recorded in the memory of the interfaced processor whenever the touch-sensitive surface of the electronic whiteboard is drawn or written upon. Moreover, a marker or user's finger can be used to touch the whiteboard's touch-sensitive surface to interact with the graphical user interface of a software application. However, the graphical user interface needs to be visible to the user. Therefore, the flat-panel of an electronic whiteboard must also be able to display images such as a computer's display of graphical user interface objects such as dialog boxes, "clickable" icons and list boxes to name a few.

A projector can be used to project a computer's display onto the whiteboard's light reflective surface. Electronic whiteboards can be either front projection or rear projection types. Examples of both front and rear projection types are shown in FIGS. 1 and 9 of U.S. Pat. No. 6,540,366 to Keenan et al. Moreover, electronic whiteboards are sometimes referred to as smart boards, a term most likely made popular by SMART Technologies Inc. of Calgary, Alberta, Canada, which sells a popular brand of electronic whiteboards under the name SMART Board.

Top of the line electronic whiteboards do not require a projector for multimedia presentations. Instead, these types of electronic whiteboards use a plasma or video type electronic display as the flat-panel surface. These types of whiteboards display computer or video images directly through the flat-panel surface similar to an ordinary plasma high definition television display or video computer display used with desktop and portable computers.

Whiteboards of the plasma or video type have a translucent touch-sensitive surface overlay fastened securely over the plasma or video flat-panel surface or screen. Pressure from a stylus or finger directed onto the overlay can be used to access or control computer applications that are in communication with a whiteboard. As with projector-based whiteboards, dry erase markers can be used to display handwritten notes and diagrams. Any notes or diagrams written to a plasma or video type whiteboard can be recorded in real-time for printout, redisplay or for electronic transmission over a local area or wide-area network, including the Internet. A whiteboard overlay for plasma displays is sold by SMART Technologies Inc., under the name SMART Board for Plasma Displays.

Electronic whiteboards are interfaced with random access memory controlled by digital processors to record all drawings, characters and words handwritten on the whiteboards. Preferably, the digital processor is a personal computer with random access memory and a hard-drive. The recorded drawings and handwritten words are stored on the personal computer hard-drive for later printout, review and/or transmission.

Electronic whiteboards can also be in communication with an instructor's interface device such as an electronic notepad and stylus. Preferably, the instructor's interface device is wireless so that the instructor can move about freely. The instructor uses the stylus to write letters, characters and create drawings that are transmitted in real-time to the electronic whiteboards.

In the preferred embodiment of the present invention, one or more electronic whiteboards are interfaced to a plurality of large video monitors having stands and weatherproof coverings. Eight to ten of these large video monitors can be spread out among a trainee audience to display the real-time contents of the electronic whiteboards, thus giving individual groups of trainees a clear and close-up view of the whiteboards' display. A weatherproof sound system having a plurality of speakers is provided to make the audio content of any training session available and clear to all trainees. Similar to the positioning of the video monitors, the speakers of the sound system can be strategically distributed among a trainee audience. Additional electronic teaching aides can include, but are not limited to, laptop computers, notebook computers, audio and video sources such as DVD video players and video cameras with microphones, opaque projectors, copy machines, facsimile machines, and wireless communication equipment such as cellular phones including modems for Internet connectivity and E-mail.

The electronic whiteboards and associated equipment that make up the mobile education system of the present invention are preferably transported by way of a High Mobility Multipurpose Wheeled Vehicle commonly referred to as an HMMWV—Shelter Carrier. The preferred shelter carrier for the present invention belongs to the HumVee family of military vehicles. This type vehicle is also used as command posts, mobile radar stations and communications units. Ideally, the mobile education system is packaged within a large box or other container that can slide into or out of a standard HumVee bed. This would allow the mobile education center to be transferred from one vehicle to another. A standard trailer could be pulled behind the HumVee shelter carrier to add additional storage and transportation for office supplies, seats, class materials and optional devices such as an electrical generator and uninterruptible power supply. Furthermore, it is preferred that the HumVee shelter is adapted to have one or more electronic whiteboards attached to at least one side of the HumVee shelter carrier for securing the whiteboards in a presentation position that is upright and facing an audience during a training session. For the purposes of this disclosure, the side of the vehicle facing the audience is referred to as the presentation side. The presentation side can be the driver's side, passenger's side or front or rear of a vehicle. Preferably, whiteboard attachment rails are fixed to a presentation side of a HumVee so that a person can quickly and easily secure a whiteboard into the presentation position. In another embodiment, the electronic whiteboards could be integral to the vehicle, being housed within recesses having protective outer doors. Moreover, the side of the vehicle could also include pullout awnings to shade the electronic whiteboards from the sun.

Variants of the mobile education center could be adapted to fit within the standard bed of the average utility or pick-up truck for non-military uses. These uses can be, but are not limited to, training law enforcement and security personnel, firefighters and first responders. Civilian uses can be, but are not limited to, sales presentations and mobile movie theaters for special events.

In operation, the mobile education center making up the present invention is transported to a field training location by a military vehicle, preferably a HMMWV shelter carrier with trailer. After arriving at a field training location, the plurality of large video monitors and speakers can be unloaded from the shelter carrier and trailer to be placed at appropriate locations about an audience area. One or more electronic whiteboards are unloaded from the shelter carrier or trailer and are releasibly attached to the side of a military vehicle such that they are held in their presentation positions. Electrical connections providing power and signals to the white boards, monitors and speakers are completed and tested before a multimedia training session begins.

Once operational checks are completed and a trainee audience is gathered and seated, an instructional presentation can begin. At any point during the instructional presentation, the instructor can use a marker, his or her finger, or a whiteboard interface device to write notes and diagrams onto the whiteboards. In the preferred embodiment, an instructor's impromptu notes and graphics can be displayed and recorded in real-time.

The invention now having been summarized, may be better visualized by turning to the following drawings wherein like elements are referenced by like numerals. The drawings are for the purpose of illustrating the invention and are not intended to be to scale.

The invention can now be better understood by a reading of the following detailed description of the preferred embodiment. It is to be understood that the illustrated embodiment is set forth as an example of the invention and is not intended to limit the invention thereto.

DETAILED DESCRIPTION OF THE PREFERRED EMBODIMENT

A mobile education center comprised of at least one electronic whiteboard networked with other electronic devices such as personal computers and video players is provided to enhance the education of a trainee audience located in an outdoor or field environment. The mobile education center is transported to the field training location by a military vehicle.

Figure 1:
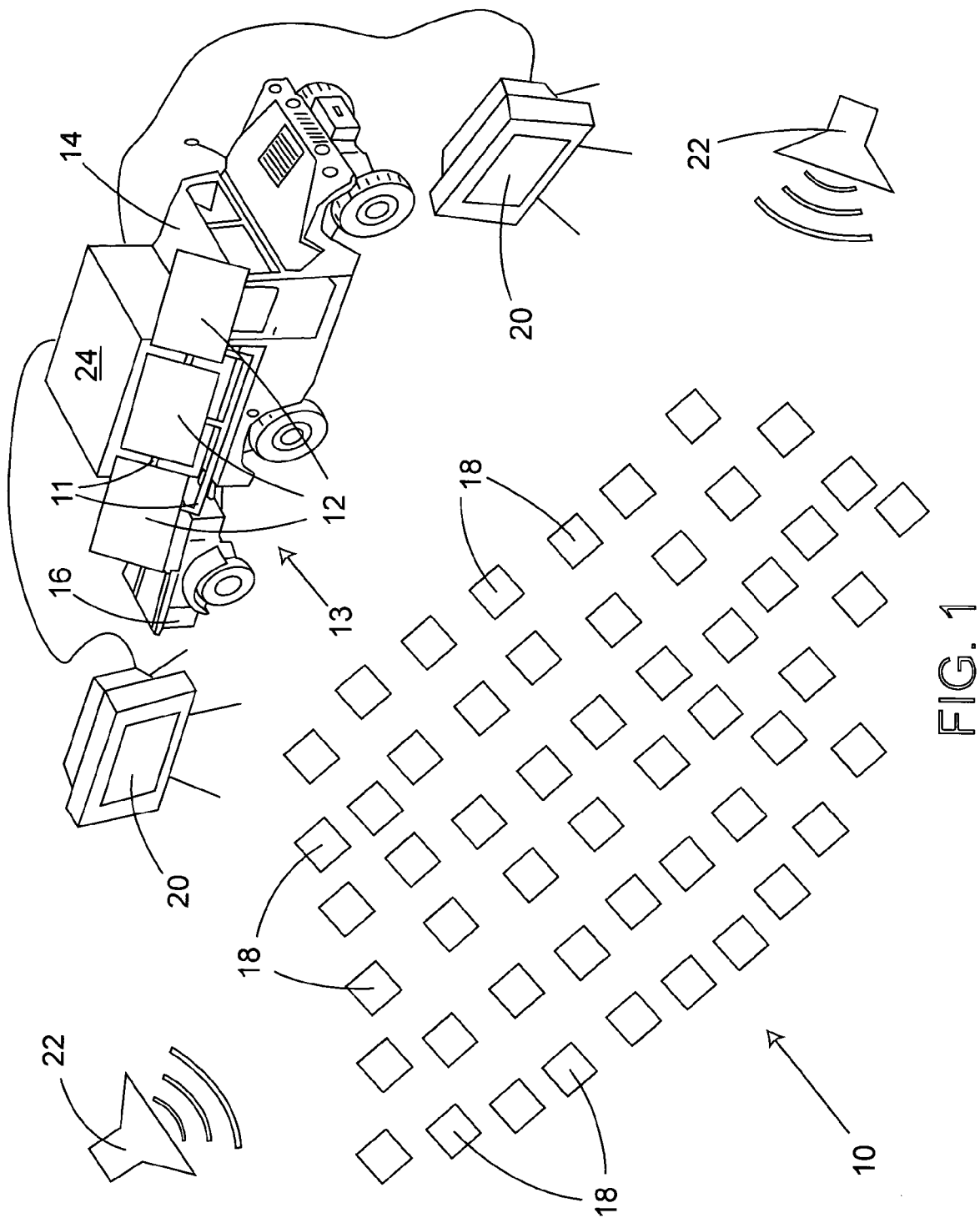
FIG. 1 is a diagram illustrating a preferred embodiment of the present invention.

FIG. 1 is a diagram showing the components preferably used to make up the present invention. As shown in FIG. 1 the mobile education center of the present invention, generally 10, is made up of one or more electronic whiteboards 12 being releasibly attachable to rails 11 attached to the presentation side 13 of an all-terrain military vehicle 14. A trailer 16 pulled by vehicle 14 can be used to transport chairs or seats 18 for a trainee audience. Large video monitors 20 along with audio speakers 22 are in communication with video and audio sources setup inside a shelter 24 carried by vehicle 14. Speakers 22 can be wireless for simple distribution around the audience area.

Figure 2:
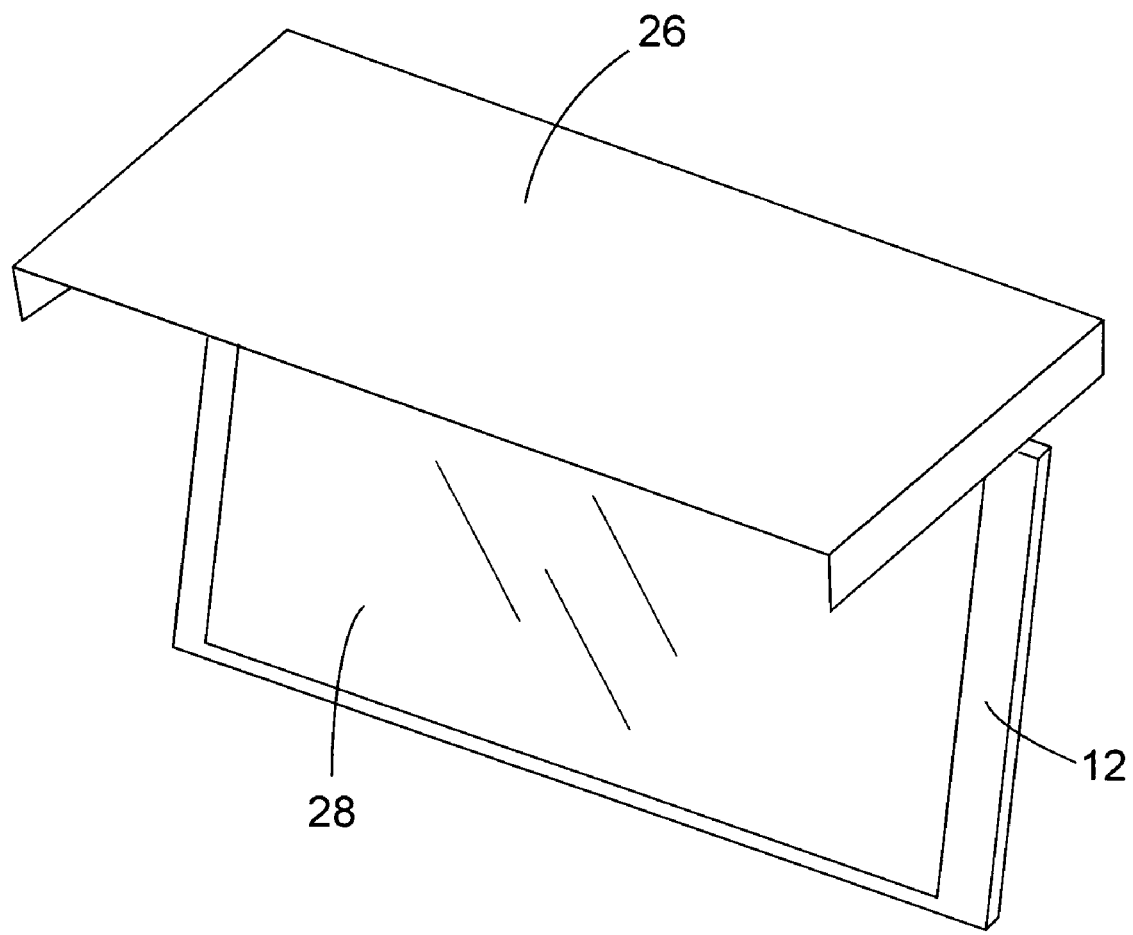
FIG. 2 depicts a combination of sun reduction devices for the electronic whiteboards.

FIG. 2 shows a combination of sun reduction devices 26 and 28 that are useable to prevent sun glare from obscuring the textual or graphical contents of the at least one electronic whiteboard when the mobile education center is used in an outdoor sunlit environment. Sun reduction device 26 is a pullout awning that can deployed above the at least one electronic whiteboard to shade it from direct sunlight. Sun glare reduction device 28 is a light-diffusing screen that can be placed over the flat-panel surface of the at least one electronic whiteboard to further reduce sun glare.

In operation, mobile education center 10 is transported to a field training location by vehicle 14. After arriving at a field training location, electronic whiteboards 12 are unloaded from either trailer 16 or shelter 24 and are releasibly attached to the audience facing side of vehicle 14. Seats 18 and video monitors 20 along with speakers 22 are unloaded from shelter 24 and trailer 16 and are placed at appropriate locations about the audience area. Before a training session begins, electrical power is applied to the mobile education center for system checks.

Once a trainee audience is seated on seats 18, a training session can begin in which one or more instructors will use electronic whiteboards 12 to present subject matter in handwritten or computerized form. Monitors 20 and speakers 22 can be used to present multimedia presentations to enhance the instruction given using whiteboards 12.

Certain modifications and improvements will occur to those skilled in the art upon reading the foregoing description. For example, one or more whiteboards could be attached to a presentation side of a trailer along with or instead of being attached to a presentation side of a self-propelled vehicle. Moreover, the touch-sensitive surface of the whiteboard could be replaced with a light-emitting diode grid that would perform the function of tracking marker or stylus movements. It should be understood that all such modifications and improvements have been deleted herein for the sake of conciseness and readability but are properly within the scope of the following claims.

What is claimed is:

1. A mobile education center for enhancing the education of a military trainee audience located in an outdoor military field environment, said mobile education center comprising:
   a) a military transport vehicle having an exterior that includes a presentation side having rails for attaching a plurality of electronic whiteboards, said vehicle being equipped to power and operate a local area network of electronic audio/visual equipment;
   b) at least one electronic whiteboard having a display side that is a flat-panel overlaid with a touch-sensitive screen interfaced to a digital processor, said whiteboard being releasably attachable to said vehicle presentation side rails, whereby said display side is viewable by the trainee audience, said whiteboard being networkable with said electronic audio/visual equipment; and
   c) a whiteboard sun glare reduction device selected from the group consisting of light-diffusing screens, pullout awnings and combinations thereof.

2. The mobile education center of claim 1, further including at least one computer for controlling said local area network of audio/visual equipment.

3. The mobile education center of claim 2, further including a wireless Internet connection for said at least one computer.

4. The mobile education center of claim 1, wherein said audio/visual equipment is selected from combinations or any one of a group consisting of electronic speakers, DVD player, video cameras, video displays, televisions, printers and fax machines.

* * * * *